May 30, 1967 H. KLUMB ET AL 3,322,905

AUTOMATIC TELEPHONE DIALING AND CALLING APPARATUS

Filed Feb. 12, 1965 6 Sheets-Sheet 1

INVENTORS
HANK KLUMB &
HENRY E. ROGERS

BY Seidel & Gonda

ATTORNEYS.

AUTOMATIC TELEPHONE DIALING AND CALLING APPARATUS

Filed Feb. 12, 1965 6 Sheets-Sheet 2

INVENTORS
HANK KLUMB &
HENRY E. ROGERS
BY Seidel & Gonda
ATTORNEYS.

May 30, 1967 H. KLUMB ET AL 3,322,905

AUTOMATIC TELEPHONE DIALING AND CALLING APPARATUS

Filed Feb. 12, 1965 6 Sheets-Sheet 3

INVENTORS
HANK KLUMB &
HENRY E. ROGERS
BY
Seidel & Gonda
ATTORNEYS.

AUTOMATIC TELEPHONE DIALING AND CALLING APPARATUS
Filed Feb. 12, 1965 6 Sheets-Sheet 4
FIG. 9
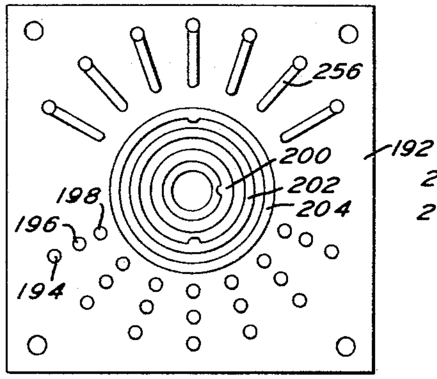
FIG. 10
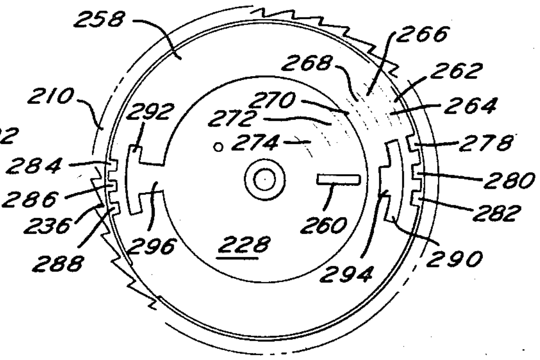
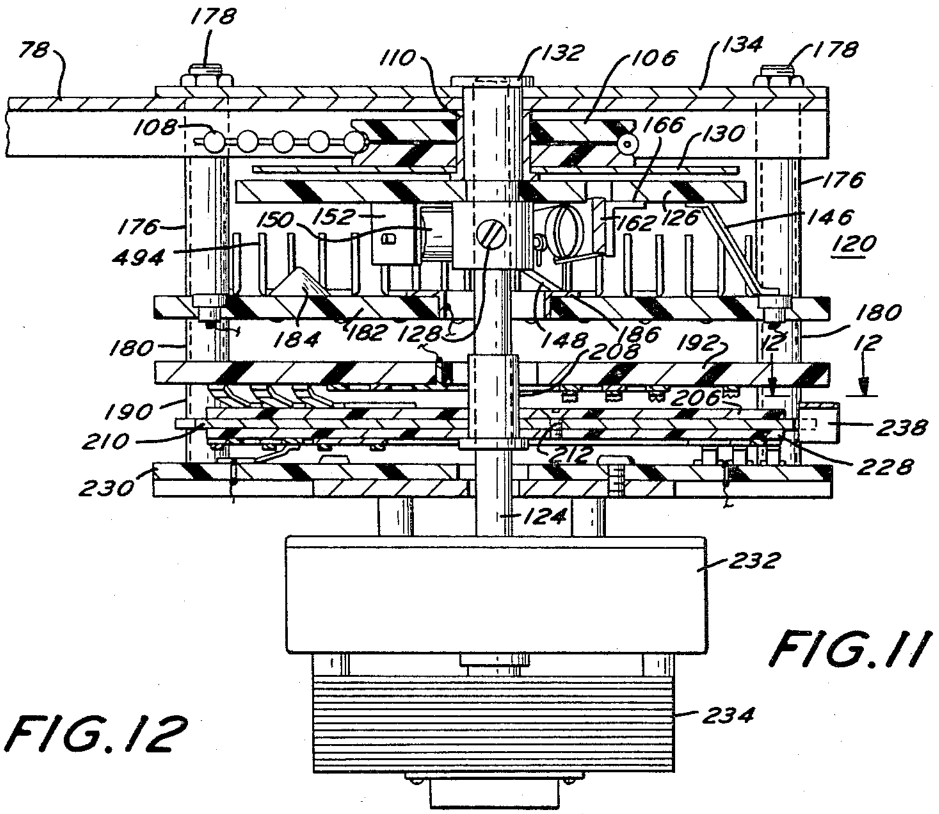
FIG. 11, FIG. 12
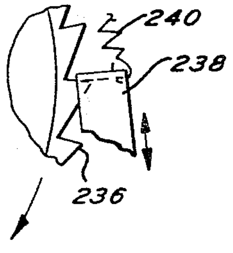
INVENTORS
HANK KLUMB &
BY HENRY E. ROGERS
Seidel & Gonda
ATTORNEYS.

AUTOMATIC TELEPHONE DIALING AND CALLING APPARATUS

INVENTORS
HANK KLUMB &
BY HENRY E. ROGERS
Seidel & Gonda
ATTORNEYS.

AUTOMATIC TELEPHONE DIALING AND CALLING APPARATUS

INVENTORS
HANK KLUMB &
BY HENRY E. ROGERS
Seidel & Gonda
ATTORNEYS.

United States Patent Office 3,322,905
Patented May 30, 1967

3,322,905

AUTOMATIC TELEPHONE DIALING AND CALLING APPARATUS

Hank Klumb and Henry E. Rogers, Philadelphia, Pa., assignors to The Teleminder Company, Philadelphia, Pa., a corporation of Delaware Filed Feb. 12, 1965, Ser. No. 432,200
14 Claims. (Cl. 179—90)

In general, this invention relates to a new and improved automatic telephone calling apparatus, and more particularly to an automatic telephone calling apparatus which can be simply and easily utilized with standard telephone equipment and is useful for transmitting predetermined messages in response to control signals.

This application is a continuation-in-part of our copending application Ser. No. 246,772 filed Feb. 24, 1964 for Automatic Telephone Calling Apparatus, now U.S. Patent No. 3,234,713.

There is a need for a simple apparatus which can be combined with standard telephone equipment for dialing predetermined telephone numbers from unitary actuators. This need particularly manifests itself in the provision of automatic apparatus for calling police, firemen or other energy personnel in response to instantaneously received distress signals. For example, a butcher would want to be called immediately upon notice that the temperature in his meat box had risen above a predetermined temperature without the necessity of hiring a special person to continuously check for such emergency. Further, a jeweler may be desirous of having an automatic means for calling the police and himself upon the first indication that a burglar has entered upon his premises.

For these reasons, it is the general object of this invention to provide a new and improved automatic telephone calling apparatus.

Another object of this invention is to provide a new and better automatic telephone calling apparatus which is responsive to a control signal to dial a telephone number.

Still another object of this invention is the provision of a new and better automatic telephone calling apparatus which, in response to a control signal, dials a telephone number, plays a prerecorded message, then dials a second telephone number and plays a second prerecorded message, makes a third and fourth telephone call if desired, until help is received to remedy the condition noted by the control signal.

Still another object of this invention is the provision of a new and better telephone calling apparatus which can be utilized with standard telephone equipment without injury thereto or modification thereof.

Still another object of this invention is the provision of a new and better calling apparatus which will enable the standard telephone equipment to be utilized in its normal manner when the telephone calling apparatus is not in use.

Still another object of this invention is the provision of a new and better telephone calling apparatus which is simple in manufacture and economical to use.

Still another object of this invention is the provision of a new and better telephone calling apparatus which cannot be stopped once its calling cycle has begun, except by a special procedure not readily ascertainable by those not familiar with the apparatus.

Other objects will appear hereinafter.

For the purpose of illustrating this invention, there is shown in the drawings a form which is presently preferred; it being understood, however, that this invention is not limited to the precise arrangements and instrumentalities shown.

FIGURE 9 is a top plan view of the connector number commutator of the present invention.

FIGURE 10 is a top plan view of the commutator plate assembly of the present invention showing program plate.

FIGURE 11 is a cross sectional view of the mechanical telephone dialing head of the present invention.

FIGURE 12 is an enlarged partial top plan view of the commutator plate assembly of FIGURE 10 and pawl used with the present invention.

Figure 1:
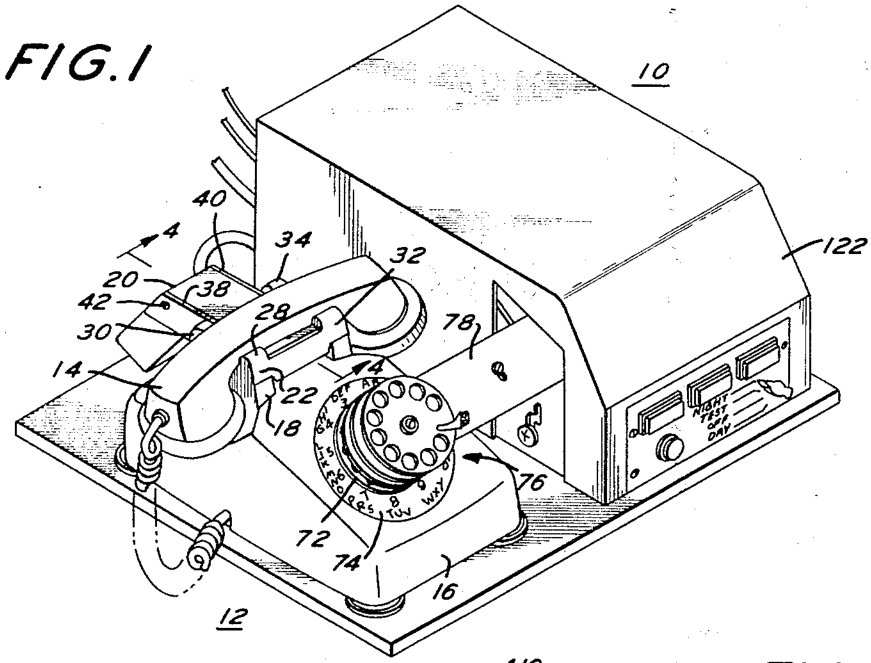
FIGURE 1 is a perspective view of the apparatus of the present invention.

In FIGURE 1, there is shown the telephone calling apparatus of the present invention generally designated by the numeral 10.

The automatic telephone calling apparatus is associated with a standard telephone set 12 comprising a receiver 14 and a base 16. The receiver 14 is lifted from the cradle 18 of the base 16 by a suitable telephone lifting mechanism 20. The telephone lifting mechanism may be a solenoid operated lifting mechanism such as the one shown in copending application Ser. No. 320,667, filed Nov. 1, 1963, entitled Telephone Operating Attachment invented by Hank Klumb and Henry Rogers. The lifting mechanism 20 includes a suitable cradle mounting means 22 which in the present invention is a molded rigid unit conforming to the outline of the cradle 18. The cradle 18 includes two pairs of spaced posts 28 and 30; and 32 and 34. The recess between the posts 28, 30 and 32, 34 is spanned by the cradle mounting means 22 so as to allow free movement of the spring biased plungers 24 and 26 shown in FIGURE 5.

Figures 4, 5:
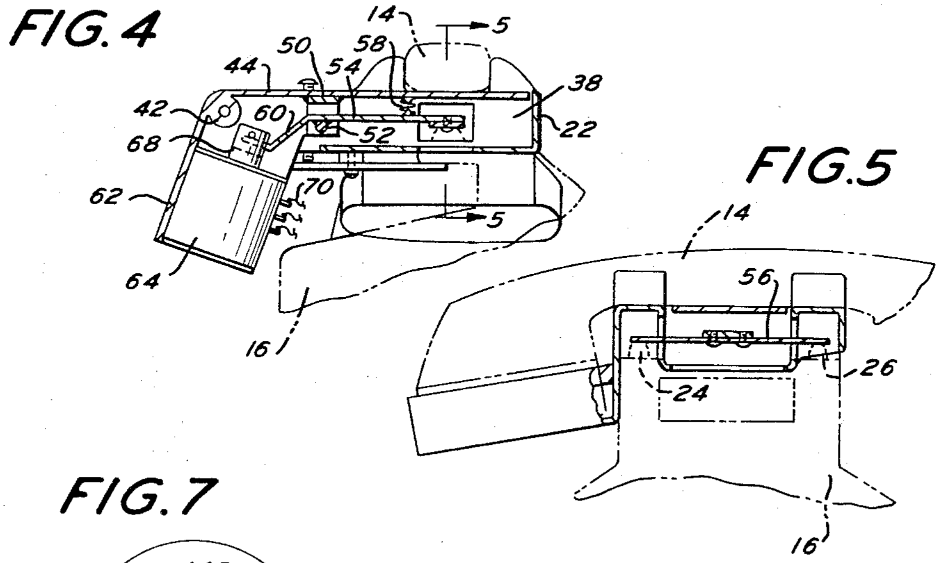
FIGURE 4 is a longitudinal sectional view of a telephone lifting mechanism used with the present invention.
FIGURE 5 is a transverse sectional view of the telephone lifting mechanism used with the present invention.

The cradle mounting means 22 has a pair of spaced backwardly extending brackets 38 and 40 at the end of which is positioned a suitable rotatably mounted rod 42 best shown in FIGURE 4. Rod 42 extends perpendicular to the brackets 38 and 40 and forms an axis for the receiver supporting piece 44. Receiver supporting piece 44 is fixedly secured to the rod 42 and extends in a forward direction between the pairs of spaced posts 28, 30 and 32, 34. The receiver supporting piece 44 is in the same plane as the flat portions of the cradle mounting means 22 which flat portions overlay the recess for plungers 24 and 26. The receiver supporting piece 44 has an inverted U-shaped bracket 50 secured to the underside thereof between the cradle 18 and rod 42. The inverted U-shaped bracket 50 maintains receiver supporting piece 44 in the same plane as said flat portions.

The downwardly extending legs of the inverted U-shaped bracket 50 support a second pivot rod 52 connected at the outer extremities thereof. Rod 52 is integrally connected with a plunger pivot bar 54 which is T-shaped having a plunger depression portion 56 extending into the recesses between the upright spaced posts 28, 30 and 32, 34 through suitable openings in the cradle mounting 22. The plunger depression portion 56 has the outer ends thereof extending over the plungers 24 and 26.

The depression portion 56 is biased away from the receiver supporting piece 44 by a suitable spring 58 connected between the plunger pivot bar 54 and the receiver supporting piece 44 on the side of the bracket 50 adjacent the cradle 22. The plunger pivot bar 54 is limited in its movement as produced by the expansion spring 58 by reason of an extension 60 which is connected to a solenoid actuator 68.

The receiver supporting piece 44 has integral therewith an angled extension 62 connected adjacent the rotatably mounted rod 42. The angled extension 62 supports a solenoid 64 with an actuator 68 connected to the extension 60.

The solenoid 64 is intended to be actuated through suitable conductors 70. In the operation of the lifting mechanism the received 14 is placed in the cradle 22 resting between the spaced posts 28, 30 and 32, 34 on receiver supporting piece 44. The receiver itself does not depress the plunger 24 and 26, but the plunger depressure portion 56 of the plunger pivot bar 54 presses the plunger 24 and 26 downwardly against their spring bias to maintain the telephone set in the off position. The plunger pivot bar 54 is so biased by the spring 58 as to pivot it about pivot rod 52 until the extension 60 abuts the top of actuator 68 as shown in FIGURE 5. Spring 58 applies a greater force to plunger pivot bar 54 than do the spring biases of plungers 24 and 26. If the receiver 14 is lifted, the spring biased plungers 24 and 26 apply an upward force to the plunger depression portion 56 thereby rotating the receiver supporting piece 44, the inverted U-shaped bracket 50, the plunger pivot bar 54, the angled extension 62, and the solenoid 64 about the rotatably mounted rod 42. The rotation of a plunger depression portion 56 and thus the receiver supporting piece 44 is stopped by the underside of the flat portion of the cradle mounting means 22. Thus, the receiver 14 of the telephone can be lifted in the normal manner to facilitate manual dialing of the telephone. There will be no interference in this function of the telephone set 12 by the apparatus 10.

When the telephone receiver 14 is to be automatically lifted, the solenoid 64 will be actuated by reason of the receipt of a telephone call signal so as to turn the telephone set "on." The telephone set is turned "on" by releasing the plungers 24 and 26. This is accomplished by the actuation of the solenoid 64 which retracts the actuator rod 68 pulling the extension 60 downwardly. The downward movement of the actuator rod 68 causes pivoting of the plunger pivot bar 54 about the pivot rod 52 against the force of spring 58. Rotation of the plunger pivot bar 54 raises the plunger depression portion 56 so that the plungers are released and telephone will be turned "on." Of course, de-energization of the solenoid 64 will cause the spring 58 to return the plunger depression portion 56 into contact with the plungers 24 and 26 and depress the same.

The base 16 has a standard rotatable spring bias dial 72 on inclined base thereof which is normally utilized by placing one finger in its holes at the numbers indicated on the dial face 74. A telephone dialer 76 is mounted over the dial 72 by a supporting arm 78. The dialer 76 is better shown in FIGURE 6.

Thus, the dialer 76 includes a dial 80 fixed to a rotatable bushing 82 by means of a threaded fastener 84. The bushing 82 extends through the arm 78 and has the sprocket 86 fixed to the stub 87 thereof. The bushing 82 also extends through a backing plate 88 fixed to the arm 78. The backing plate 88 has printed thereon the dial numbers from 1 through 9 and exchange letters in the same manner as the dial face 74. There are 10 holes in the dial 80 spaced around the circumference thereof adjacent its periphery and in alignment with the numbers 1 through 9 and 0. A finger stop 90 is fastened to the arm 78 at a position spaced circumferentially from "1" hole. The finger stop 90 acts in the ordinary manner to indicate when the dialer should be released after dialing a particular number. After a number has been dailed by rotating dial 80 until a finger contacts finger stop 90, it is released and the spring 92 which has one end attached in dial opening 94 and the other end fixed to backing plate 88 in opening 96 causes the dial 80 to return to its original position.

Rotation of dial 80 causes sprocket 86 and disc 98 to rotate with it. Disc 98 is fixed to sprocket 86 and rotatable bushing 82 by means of threaded fasteners 100. A fastener 102 fixes finger 104 adjacent the outer periphery of disc 98. Finger 104 has an outer diameter that is substantially equal to the inner diameter of the holes in dial 72. Finger 104 is positioned on disc 98 so that it may be inserted in the "0" hole in dial 72. Accordingly, rotation of the dial 80 will impart the same amount of rotaiton through dial 72, thus enabling telephone 12 to be dialed when the telephone calling apparatus is in operative association therewith.

Sprocket 86 is rotatably connected to a sprocket 106 by means of a chain 108. Sprocket 106 is fixed on the reduced diameter portion of a hub 110, FIGURE 11. An idler sprocket 112 is rotatably mounted on the shank of a threaded fastener 14 that extends through slot 116 in arm 78. The fastener 114 threadedly cooperates with nut 118 to rotatably retain idler sprocket 112 in its position. By adjusting the position of fastener 114 in slot 116, the tension on chain 108 can be adjusted.

A telephone dialing head 120 is mounted within a telephone signal circuit housing 122. The dialing head 120 is better shown in FIGURES 6 and 11.

Thus, the dialing head 120 includes a shaft 124, fixedly secured to a rotating clutch plate 126 through a screw 128. A free-floating clutch plate 130, axially aligned with the shaft 124, is held in place by the enlarged end of hub 110 which is rotatably aligned over the end cap 132. The end cap 132 receives shaft 124 in axial alignment therewith and thus rotatably supports shaft 124, hub 110, sprocket 106, and free-floating clutch plate 130 in axial alignment. This entire mechanism is held in place by a set screw 128 through a collar on clutch plate 126, fixing it to shaft 124. The free-floating clutch plate 130 does not normally rotate with the clutch plate 126 and shaft 124 due to the free rotational alignment of hub 110 on end cap 132. The free-floating clutch plate 130 is engaged with sprocket 106 by means of pegs 136 and 138 extending therethrough. Thus rotation of sprocket 106 and free-floating clutch plate 130 results in a similar amount of rotation of dialer 76 including dial 80 and disc 98.

The free-floating clutch plate 130 has a tab 140 extending from an outer peripheral portion thereof. Normally, the free-floating clutch plate 130 is biased by means of spring 92 to a rotational position wherein the tab 140 engages a stop 142, which depends from housing plate 134. In this manner, the dial 80 and free-floating clutch plate 130 are held in their starting position with the dial holes aligned with the dial numbers.

The free-floating clutch plate 130 has ten holes 144 spaced along a circular path, concentric with the center of free-floating clutch plate 130. Each of these holes 144 corresponds, in spaced relation about the free-flowing clutch plate 130, to the finger holes in dials 72 and 80. The reason for this proportional relationship will be discussed below.

The rotary clutch plate 126 has mounted on the lower face thereof an outer spring biased commutator contact 146 and an inner spring biased common contact 148. A commutator switch 150 is also mounted on the lower face of rotary clutch plate 126 by means of a U-shaped bracket 152. It should be noted that, for purposes of the claims, the rotary clutch plate 126 can also be known as a driven member or plate, and the free-floating clutch plate 130 can be defined as a free-wheeling member or plate.

Figure 7:
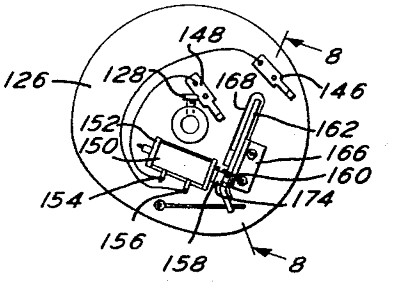
FIGURE 7 is a top plan view of the clutching actuator of the present invention.

The commutator switch 150 has two terminals 154 and 156 connected to the contacts 146 and 148, as shown in FIGURE 7.

Figure 8:
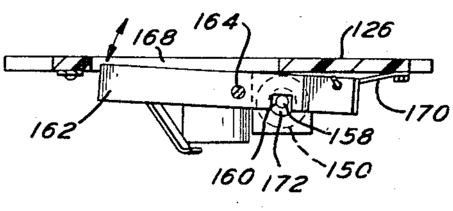
FIGURE 8 is a sectional view of the clutching actuator shown in FIGURE 7 taken along the line 8—8.

As best shown in FIGURE 8, the commutator switch 150 has an actuator rod 158 extending therefrom. The end of actuator rod 158 is placed within a slot 160 in rocker arm 162. The rocker arm is rotatable about a pin 164 attached to a bracket 166 mounted to clutch plate 126.

A slot 168 is formed in the rotary clutch plate 126. The slot 168 is aligned below the holes 144 in free-floating clutch plate 130 for engagement by the rocker arm 162 in holes 144. As best shown in FIGURE 8, the rocker arm 162 can rotate about pin 164 so that its free end will be above clutch plate 126. The rocker arm 162 easily fits within the slot 168 as it is slightly smaller in width than the width of slot 168. The free end of rocker arm 162 is spaced from the center of rotary clutch plate 126 a distance equal to the radius of the path of holes 144 in rotary clutch plate 130.

A spring 170 is fixed to clutch plate 126 at one end and engages rocker arm 162 at the other end thereof. The force of spring 170 on the rocker arm 162 is adjusted so that it normally tends to rotate the free end of rocker arm 162 through the slot 168 as indicated by the double headed arrow in FIGURE 8.

The actuator rod 158 has an enlarged end 172. A coil spring 174 is positioned in axial alignment with the actuator rod 158 between its enlarged end 172 and bracket 152. The force of coil spring 174 biases the actuator rod 158 outwardly into slot 160. In this position, the actuator rod 158 retains the rocker arm 162 from being pivoted upwardly through slot 168 by the force of spring 170.

The free-floating clutch plate 130, and the rotating clutch plate 126 can be manufactured of a non-conducting material. As best shown in FIGURE 7, the rotating clutch plate 126 is in the form of an eccentric cam.

A support 182 is held in position below clutch plate 126 by means of spacers 176 and 180 which are mounted in axial alignment with bolts 178. The support 182 has mounted thereon a cam 184 for engaging the end of rocker arm 162 adjacent its end opposite to the free end which projects through slot 168. The cam 184 will engage the rocker arm 162 once during each cycle of rotation of the rotary clutch plate 126. If the actuator rod 158 has been withdrawn so that the free end of rocker arm 162 projects through slot 168 into engagement with a hole 144 in free-floating clutch plate 130, then the cam 184 will rotate the rocker arm 162 out of engagement with the free-floating clutch plate 130 and permit the actuator rod 158 to be biased into slot 160 by spring 174.

Support 182 has an enlarged opening in the center thereof through which shaft 124 passes. The enlarged opening is provided with a circular contact 186. The inner spring biased common contact 148 is continuously in contact with the circular contact 186. Further, the support 182 is provided with ten contacts 188 spaced about a path concentric with the path of travel of outer spring biased commutator contact 146. Thus, when clutch plate 126 is rotated, the inner common contact 148 is continuously making contact with circular contact 186 and the outer commutator contact 146 sequentially makes contact wtih contacts 188.

From the foregoing, it should be apparent that rotation of the rotary clutch plate 126 will cause spring biased commutator contact 146 and common contact 148 to wipe the contacts 188 and 186 respectively. With energization of a particular one of the contacts 188 and circular contact 186, when the spring biased commutator contact 146 hits the energized one of the contacts 188, the circuit is completed through the commutator contact, to the solenoid 150, and to wiper contact 148 and a signal is transmitted to solenoid 150. Solenoid 150 will then retract actuator rod 158 from engagement with the rocker arm 162, in slot 160. When the actuator rod 158 clears rocker arm 162, the spring 170 causes the rocker arm 162 to pivot about pivot pin 164 inserting the free end of the rocker arm into engagement with the particular hole 144 in free-floating clutch plate 130 that is immediately above the free end at that moment. This completes the engagement of free-floating clutch plate 130 with rotary clutch plate 126. When the free end of rocker arm 162 is engaged in a hole 144, the sprocket 106 will then rotate. Rotation of sprocket 106 drives chain 108 which rotates sprocket 86 and dial finger 104. Rotation of dial finger 104 will then rotate dial 72. This rotation will continue until the free-floating clutch plate 130 is disengaged from the rotary clutch plate 126. This will occur before tab 140 hits post 142.

When the rocker arm 162 reaches the position where it engages cam 184, the rocker arm 162 will rotate about pivot pin 164 until it is free of hole 144. Since the solenoid will have been de-energized after passing the particular energization contact 188, the spring bias of spring 174 will push the actuator arm forward until it is engaged in slot 160 latching the rocker arm 162 in place. The rotary clutch plate 126 will thus remain disengaged from free-floating clutch plate 130 until outer spring biased commutator contact 146 wipes another energized contact 188. During this de-energization period, the spring 92 will bias dials 80 and 72 together with free-floating clutch plate 130 to its starting position wherein tab 140 is resting against stop 142. It should be apparent that the particular number dialed will be determined by the number of contacts 188 between the particular energized contact and the point where cam 184 engages rocker arm 162.

Spaced below the support 182 by the spacers 180 and 190 aligned on bolts 178, is the emergency number commutator plate 192. The commutator plate 192 is manufactured of an insulating material and has three circular rows of contacts 194, 196 and 198 thereon. Each group of contacts 194, 196 and 198 consists of seven contacts equally spaced about the periphery of the commutator plate 192 at 20 degree intervals. The seven contacts of each group of contacts 194, 196 and 198 are associated with inner continuous contacts 200, 202 and 204. (See FIGURE 9. The continuous contacts 200, 202 and 204 may take form of continuous strips of metal inlaid in the insulated surface of commutator plate 192.

A rotatable wiper blade support 206 is mounted for rotation about the shaft 124 on the hub 208. The rotatable wiper blade support is made of an insulating material and thus is insulated from the gear 210 to which it is attached by threaded fastener 212. The rotatable wiper blade support 206 has fixedly secured to the top side thereof six conducting wiper blades in two groups of three consisting of 214, 216, 218 and 220, 222, 224. The group consisting of blades 214, 216, 218 is spaced radially outwardly from the center of support 206 so as to make wiping contact with contacts 194, 196 and 198 respectively when gear 210 is rotated. Wiper blades 220, 222, 224 make continuous wiping contact with continuous contacts 204, 202 and 200 when support 206 is rotated by movement of gear 210.

The rotatable wiper blade support 206 supports a seventh wiper blade 226 spaced radially outwardly from the center of support 206 so that it makes wiping contact with the contacts 196. The blade 226 is spaced diametrically opposite the blade 216 so that blades 226 and 216 can never make simultaneous contact with contacts 196.

Figure 6:
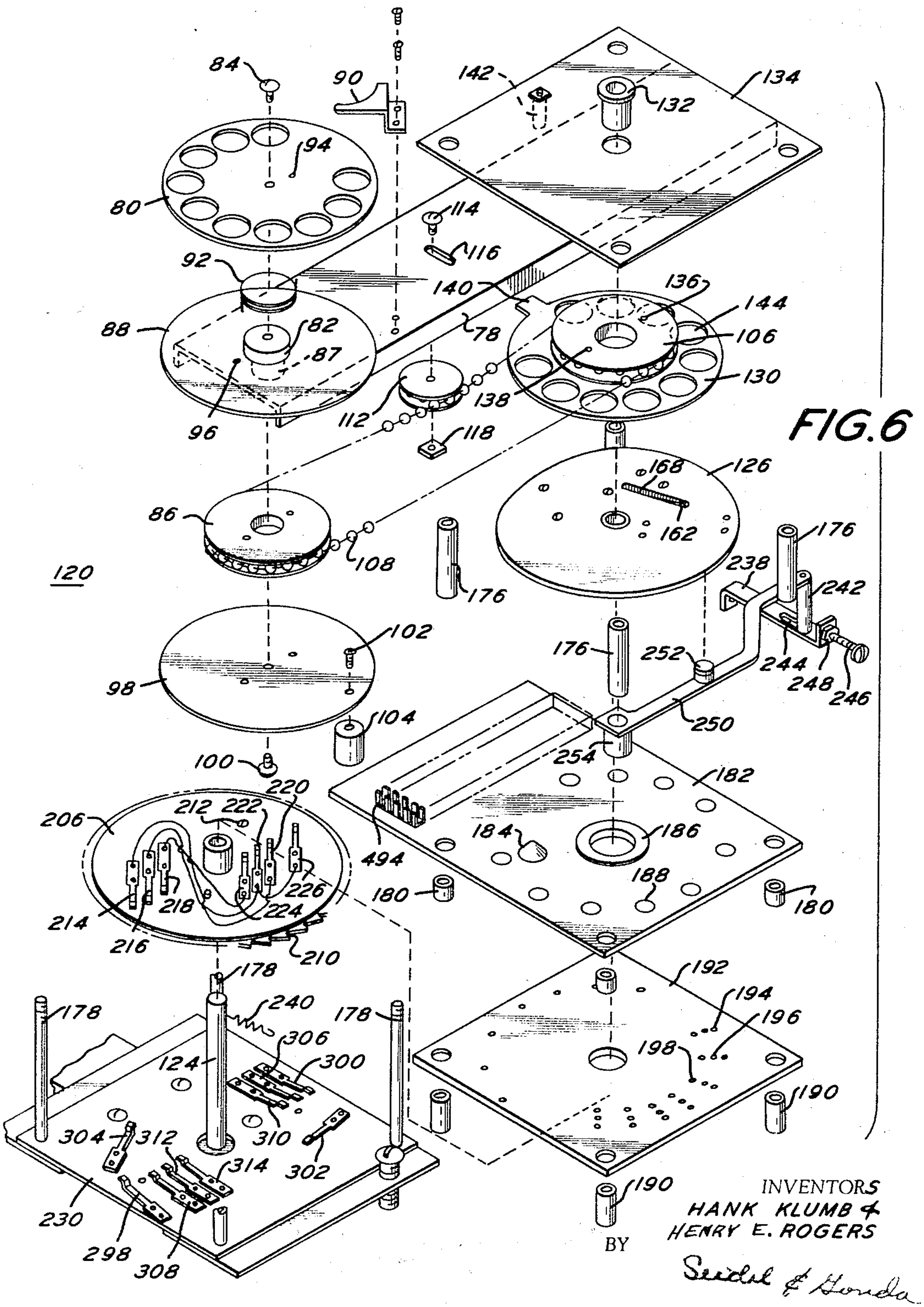
FIGURE 6 is an exploded view of the mechanical telephone dialing head of the apparatus shown in FIGURE 1.

As shown in FIGURE 6, blade 226 is connected to blade 222 which is connected to blade 216. Blade 220 is connected to blade 214 and blade 224 is connected to blade 218. Thus, the support 206 and its associated wipers 14–226 serve to close a circuit which may be associated ith contacts 194, 196 and 198, and continuous contacts 00, 202 and 204.

The commutator plate 192 and the rotatable wiper lade support 206 form a commutator switch control ead.

Contacts 188, 194, 196 and 198, together with wipers 14–226 are connected to connectors 494 by appropriate onducting leads. Other leads from the electronic circuitry re also connected to connectors 494. This energization ower may be brought into the head 120. As indicated oove, the rotatable wiper blade support 206 is fixedly onnected to the gear 210 by fastener 212. The gear 210 fixed to rotatable hub 208. Also connected to the gear 10 and rotatable therewith is a program wiper plate 28.

The spacers 190 support the commutator plate 192 in paced-away relationship to the program wiper plate blade ipport 230. The assembly consisting of wiper blade ipport 206, gear 210 and program wiper plate 228 ounted on hub 208 which rotates about shaft 124 is eld in position between commutator plate 192 and rogram wiper blade support 230 by the pressure of the iper blades 298–314 supported by said wiper blade ipport 230.

The bottom of blade support 230 has mounted thereto e gear box 232 for electric motor 234. The gear box 32 contains suitable gears keyed to the shaft 124 and the utput shaft of motor 234. In this manner, the shaft 124 driven by the motor 234. The gearing within gear box 32 provides the correct rotational speed for shaft 124.

The gear 210 has inclined teeth 236 in the manner of a atchet wheel. The inclined teeth 236 are engaged by a iitable pawl 238. The pawl 238 is spring biased by a pring 240 suitably connected to a bolt 178. The spring 40 biases the pawl 238 out of engagement with the radial dge of teeth 236. The pawl 238 is pivotally connected to connector rod 242 which engages the pawl 238 in slot 44. The position of rod 242 in slot 244 may be adjusted y means of adjustment screws 246 and lock nut 248. Vhen adjustment screw 246 is moved forward aaginst rod 42, it prevents spring 240 from drawing pawl 238 closer bolt 178 to which the spring is attached.

Connector rod 242 is fixedly connected to pawl actutor 250. Pawl actuator 250 extends at approximately a ght angle with respect to pawl 238 and pivotally ounted over separator 176. Pawl actuator 250 has a cam ollower 252 mounted thereon. The height of connector od 242 and the pivotable connecting end 254 of pawl ctuator 250 is such that the cam follower is mounted nmedaitely adjacent the edge of rotary clutch plate 126, hich, as previously indicated, is in the shape of an ecentric cam. This is best shown in FIGURE 7. The ecentricity of rotary clutch plate 126 is such that rotation hereof causes the pawl actuator 250 to pivot about its onnecting end 254, drawing the pawl rearwardly against e bias of spring 240. The rearward movement of pawl 38 is adjusted to be equal to at least the length of one otch or tooth 236 for each rotation of plate 126. The pring 240 constantly biases the cam follower 252 into ontact with the peripheral edge of rotary clutch plate 26. Thus, spring 240 will draw the pawl 238 forward to ngagement with the next notch or tooth 236 on gear 210 hen the radius of the portion of rotary clutch plate 126 losest to cam follower 252 has decreased to its minimum.

There are 36 teeth on the gear 210. Accordingly, gear 10 rotates ten angular degrees with each rotation of late 126. The contacts 194, 196 and 198 are spaced apart 0 angular degrees. Accordingly, the wiper blades 214, 16 and 218 provide a connection between contacts 194, 96, 198 and their associated continuous contacts 204, 02 and 200 on every second rotation of plate 126. When here is no contact—that is when wiper blades 214, 216 nd 218 are between adjacent contacts 194, 196 and 198, he solenoid 150 is not energized. Free-floating clutch plate 130 is released when the cam 184 biases arm 162 out of engagement with plate 130, for permitting the dial 80 to be returned to the starting position by the bias of spring 92.

Referring to FIGURE 9, it will be noted that commutator plate 192 has mounted thereon in addition to contacts 194, 196 and 198 seven elongated contacts 256 spaced apart by 20 angular degrees as are the contacts 194, 196 and 198. Elongated contacts 256 serve the same function that contacts 194, 196 and 198 serve, except because of their elongation in a radial direction, they will be simultaneously contacted by wipers 214, 216 and 218 during each rotation of wiper blade support 206 and gear 210. This means that for reasons to be more fully explained below, the wiper blades 214, 216 and 218 function to initiate a dialing response twice during each rotation of wiper blade support 206. The first dialing response occurs when wipers 214, 216 and 218 make contact with respective contacts 194, 196 and 198, and the second dialing response occurs when the wipers make contact with elongated contacts 256. The elongated contacts 256 may alternately be referred to as systems contacts.

As indicated above, the lower side of gear 210 has mounted theeron a program wiper plate for rotation therewith. The program wiper plate 228, is made of an insulating material having annular flat conducting sheets attached thereto. As shown, the conducting sheet is provided with a plurality of notched-out sections exposing the insulating material. The purpose and function of the particular notched-out portions will become apparent with the explanation provided below. However, in general the function of the program wiper plate is to aid in programming the operative relationship between dialing head and tape recorded so that tape recorder plays the particular desired recorded message at exactly the correct time after the dialing head has automatically dialed a particular number.

Blade support 230 has a plurality of wiper blades mounted thereon. These wiper blades are mounted upon support 230 so that their free ends stand away from support 230 and engage program wiper plate in wiping relationship therewith. The wiper blades mounted on support 230 are made of a conductive spring material and support program wiper plate 228 above plate support 230 on shaft 124. As shown, the conducting sheet 258 is a continuous piece of material. Thus, it effectively is a common conductor for the current that may be fed into it by the wiper blades mounted on blade support 230. In addition to the conducting sheet 258, a contact sheet 260 is also fixed upon program wiper plate 228. Contact sheet 260 will also act as a common conductor for the wipers that contact it simultaneously, although it is not common with conducting sheet 258.

Conducting sheet 258 is in effect a plurality of common conducting tracks having a common connection. To illustrate this, a plurality of curved lines has been drawn on FIGURE 10 to indicate the position of the several tracks. It is to be understood, that in the actual construction, such lines would not appear, but for purposes of illustration of this invention, it has been convenient to place them on the program wiper plate 228. As indicated, the lines are concentric circles about the program wiper plate 228. These concentric tracks may be designated as follows:

The first track 262 extends about the outer periphery of the conducting sheet 258, and thus includes the six diametrically opposed notches 278, 280, 282, 284, 286 and 288.

The second track 264 is a continuous one and runs in between the notches 278–288 and the third track 266.

The third track 266 includes the openings 290 and 292 which form the cross bar of T-like openings in conducting sheet 258.

The fourth track 268 includes the upright portion 294 that opens into opening 290. Track 268 also includes a portion of the upright opening 296 that is closest to opening 292.

The fifth track 270 is continuous except for the opening 296.

The sixth track 272 is spaced radially inwardly from the conducting sheet 258 and makes contact with part of contact sheet 260.

The seventh track 274 is spaced radially inward from track 272 and like it, makes contact only with sheet contact 260.

As shown in FIGURES 6 and 11, the program wiper plate 228 is mounted above the blade support 230 and makes contact with the blades supported thereon. These blades are mounted upon the blade support 230 in a position spaced radially outwardly from shaft 124 so that they make contact with the above described tracks in the following manner:

Wiper blades 298 and 300 are spaced farthest from shaft 124 and hence make contact with the first track 262 when program wiper plate 228 is rotated. Wiper blades 302 and 304 are mounted so that they make contact with the second track 264. Wiper blade 306 is mounted so that it makes contact with the third track 266, and wiper blade 308 is mounted so that it makes contact with a fourth track 268. Wiper blade 310 is mounted to make contact with the fifth track 270, and wiper blades 312 and 314 are mounted to make contact with the sixth and seventh tracks 272 and 274 respectively.

The wiring of the telephone dialing head has been omitted from the showings in FIGURES 1 to 12 in order to more clearly present the mechanical structure. It will be understood by those skilled in the art that the contacts, and solenoids illustrated in FIGURES 1 to 12 are listed in the manner shown in circuit diagram of FIGURES 13A and 13B. Further, it should be understood that each of the groups of contacts 194, 196, 198 and 256 represent a particular telephone number which is to be automatically dialed in accordance with the principles of the present invention. For example, the telephone number associated with the contacts 194 may be for the police. These contacts are connected directly to particularly ones of the contacts 188 on the support 182. Similarly, the telephone number associated with contacts 198 may be for the fire department and the telephone number associated with contact 256 may be for the property owner.

Figure 13A:
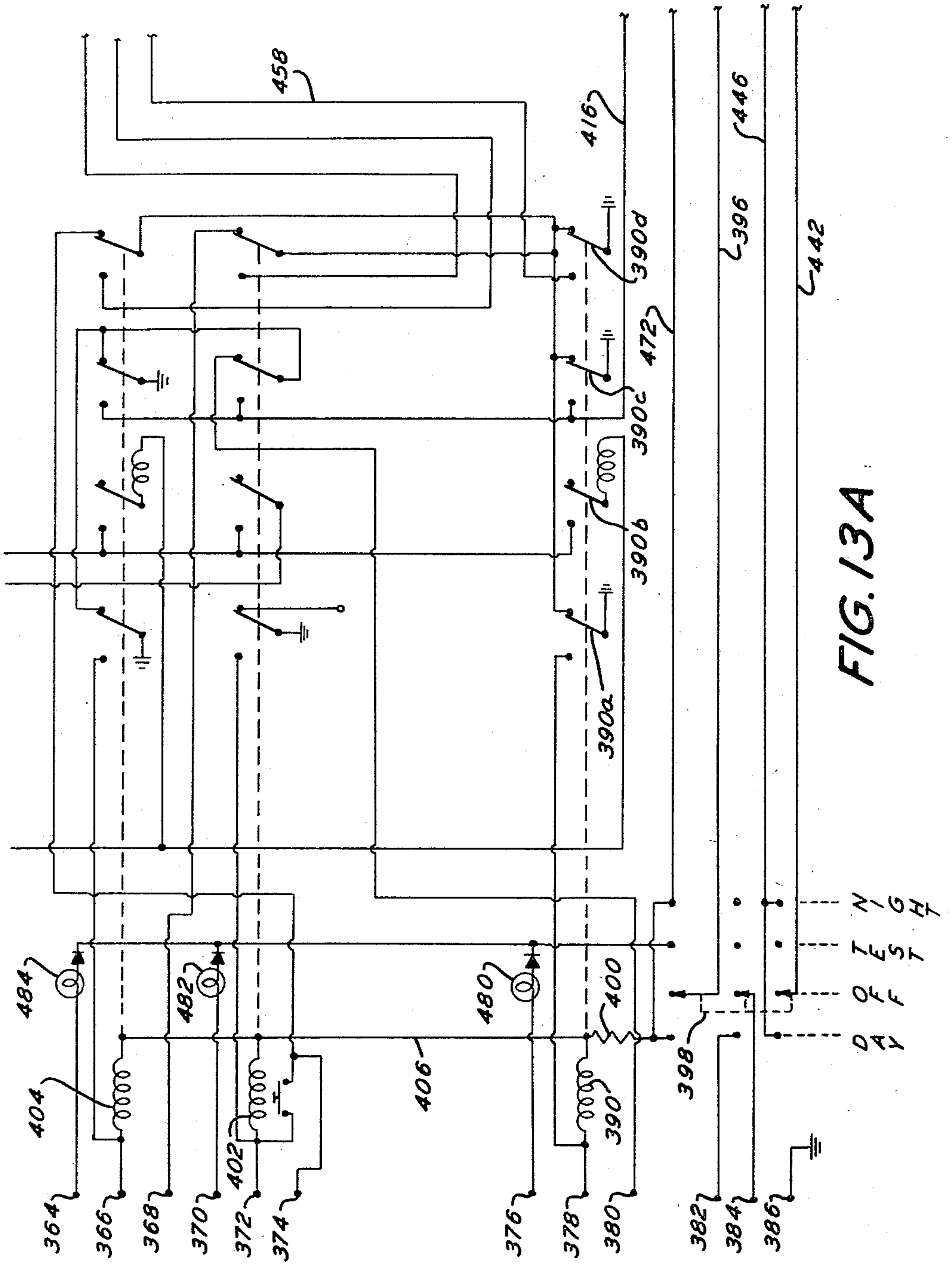
FIGURE 13A is a partial electrical schematic for the apparatus of FIGURES 1 to 12.
Figure 13B:
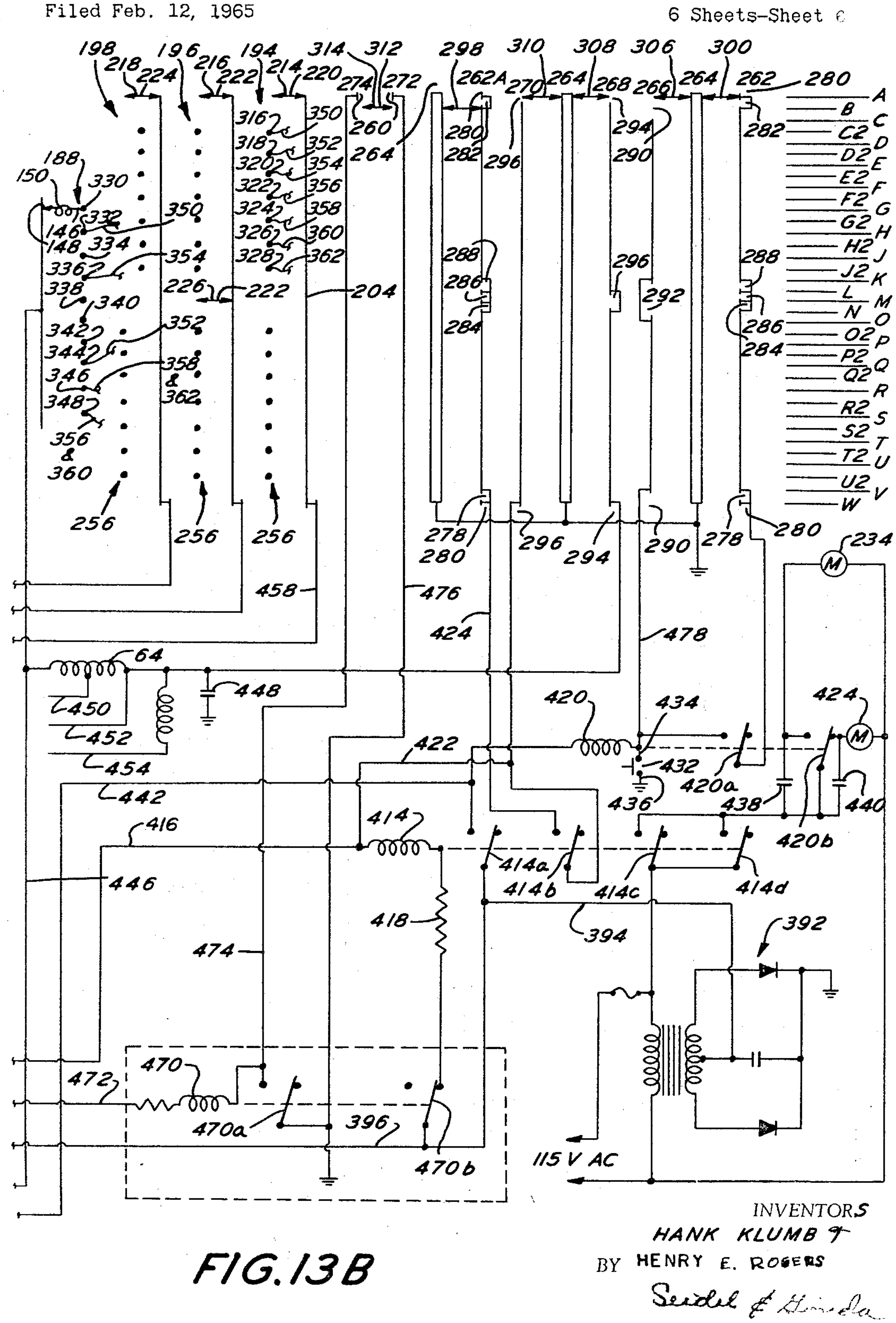
FIGURE 13B is a partial electrical schematic of the apparatus of FIGURES 1 to 12 which when joined with the schematic of FIGURE 13A as indicated thereon, forms the complete electrical schematic for the present invention.

FIGURE 13B is a schematic illustration of the contact and track layout. Although the contacts and tracks are assembled in a circular configuration in FIGURES 1 to 12, they have been shown diagrammatically in straight line configuration in this figure. This has been done to simplify the explanation and wiring diagram. In other words, the schematic of FIGURE 13B is a straight line projection of the actual embodiment.

The connections between the contacts 188 and the contacts 194, 196, 198 and 256 have not been completely illustrated as this would unduly complicate the drawing. However, lines connected to two particular contacts have been designated with the same number to indicate that they represent a common connecting lead.

To illustrate, if the telephone number of the police is "937–1212" the first contact 316 of contacts 194 is provided with conducting lead 350 that is connected to contact 332 which in effect is the ninth contact of the ten contacts 188 representing the ninth hole in a dial 80. The second contact 318 would be connected by lead 352 to the contact 344, the third contact 320 would be connected by lead 354 to contact 336, the fourth and sixth contacts 322 and 326 would be connected through their leads 356 and 360 to contact 348 of group 188, and the fifth and seventh contacts of group 194, 324 and 328, would be connected through their leads 358 and 362 to contact 346 of group 188.

Obviously, other connections could be made for other telephone numbers, it being understood that the contacts of each group of contacts 194, 196, 198 and 256 are connected sequentially to the contacts of contact group 188 associated with the particular number desired to be dialed.

All of the groups of contacts 194, 196 and 198 are similarly connected for particular numbers. For example, the group 256 will be considered to be connected for the telephone number of the home of the owner of a business establishment utilizing the automatic telephone apparatus of the present invention. The group 198 will be considered to be connected for the telephone number of the fire department.

The circuit of the FIGURES 13A and 13B will be described in an integrated discussion of the particular elements thereof with the operation of the telephone calling apparatus of the present invention. Thus, with the telephone calling apparatus of the present invention connected in the manner shown in FIGURES 13A and 13B, the operation is as follows:

The circuit of FIGURES 13A and 13B will be discussed with respect to a signal which indicates that the police should be called as a burglary is in progress. This signal may be initiated in any number of conventional means used to trip a burglar alarm.

Under these conditions, a burglar alarm someplace in the building is tripped. This burglar-alarm is operative to short contacts 378 and 380 which are the police call input terminals. Shorting of contacts 378 and 380 energizes relay 390 from direct current power supply 392. The current flows from power supply 392 through conducting leads 394 and 396 to switch 398 which previously would have been moved from the off position shown in FIGURE 13A to the day or night position. The resistor 400 provides the necessary voltage drop for operation of the relay 390 and the systems and fire relays 402 and 404. Shorting of contacts 378, 380 also operates to prevent energization of the systems relay 402 and fire relay 404 by opening their ground circuits.

It will be noted that terminals 376, 378 and 380 have their systems call or fire call counterpart in terminals 370, 372 and 374 and 364, 366 and 368 respectively. Terminals 366 and 372 are commonly connected through their respective relays to lead 406 which is also connected through relay 390 to terminal 378.

Police call relay 390 has four switches, 390*a*, 390*b*, 390*c* and 390*d*. 390*a* is operative to latch relay 390 into the closed position by connecting it to the ground. When switch 390*b* is closed, it energizes the recording head 408 of the tape deck 410 to pick up and transmit a message recorded on one of the tracks of a twin track recording tape 412. The tape 412 is on the tape deck 410 shown in FIGURE 2.

Switch 390*c*, when closed, completes the circuit to energize relay 414 through conducting lead 416. Relay 414 is energized from power supply 392 through resistor 418 in switch 470*b* and is connected to switch 390*c* through lead 416. Energization of relay 414 closes switches 414*a*, 414*b*, 414*c* and 414*d*. Switch 414*a* completes the circuit from power supply 392 through lead 394 to relay 420. Switch 414*b* completes the connection of power supply 392 through relay 414, through conducting lead 422 to conducting lead 424. Conducting lead 424 is connected to first track 262A, which is the same as track 262 but for purposes of this discussion had to be duplicated twice to illustrate the operation of the invention. The first track is now energized. Switches 414*c* and 414*d*, when closed, connect the 115 volt A.C. source to switch 420*c* for selective operation of dialer motor 234 and tape recorder motor 424.

At this point in the discussion, reference should be made to the representation of the tracks in FIGURE 13B. As illustrated in FIGURE 13B, the seven tracks 262–274 are shown as isolated elements each being connected to respective lead in wires for energization thereof. This would be the same as if the conducting sheets 258 and 260 had been placed on program wiper plate 228 in seven separate tracks. This approach has been taken to help illustrate the invention. In actuality, the conducting sheet 258 is one common conductor as is sheet 260. In FIGURE 13B, the various wiper blades are illustrated as double-headed arrows. These wiper blades are connected to a common point. Thus, in effect, the function of the tracks and wiper blades have been reversed for purposes of illustrating the invention. The wiper blades are shown as the moving elements and the tracks as the fixed elements. Whereas, in actuality, it is the tracks that move and the blades that are fixed. However, those skilled in the art will readily recognize that the movement between the wiper blades and tracks is relative, hence the reversal of connections and functions is possible. The first track 262 is illustrated twice for simplicity. The second track 264 has been illustrated three times and is connected to ground. A number of lettered lines have been provided to the right of the tracks. There are 36 of these lettered lines and they represent positions of ten angular degrees along the several tracks. By placing a rule on any of these lettered lines and following the rule across, the relative position on the tracks and on the contacts 194, 196, 198 and 256 can be determined.

With respect to the wiper blades 214 through 226, because they move on the wiper blade support 206, they have been shown in their actual operative positions.

Figures 2, 14:
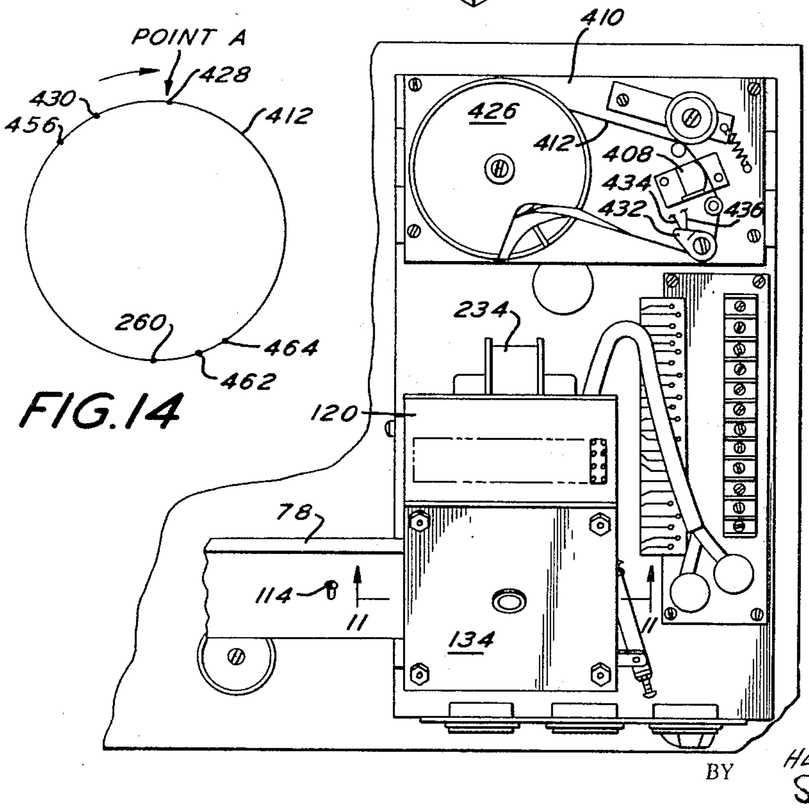
FIGURE 2 is a top plan view of the apparatus of the present invention with the chassis thereof exposed.
FIGURE 14 is a diagrammatic showing of the endless tape utilized with the present invention.
Figure 3:
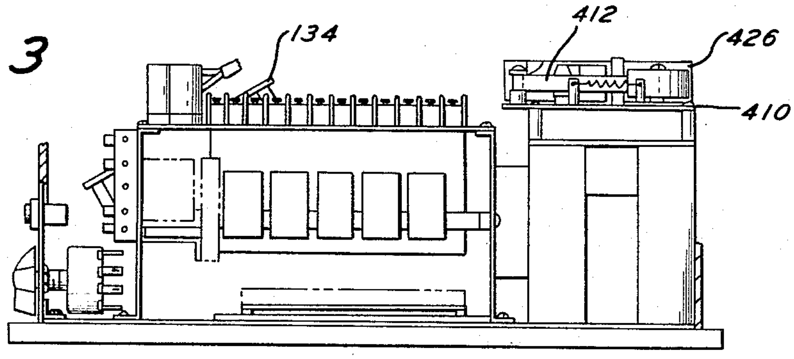
FIGURE 3 is a side view of the apparatus of the present invention with the cover thereof removed.

The tape recorder 410 is a double track unit, having a recording head 408. The recording head is energized in accordance with known principles to pick up the particular track desired. For example, the recording head 408 may be energized to pick up the police message track on the tape 412. The tape 412 is shown in FIGURE 14 representatively. It is of the continuous type, i.e., it feeds from the inside of the reel 426 and is an endless tape. For the purposes of the description herein, the tape 412 is considered to be 637½ inches long and is moved at 3½ inches per second by the tape recorder motor 424. The tape shown in FIGURE 14 is driven clockwise.

As has been indicated above, the tape recorder motor 424 has been energized by relay 414 through switches 414*c*, 414*d* and 420*b*. Accordingly, tape 412 begins to run beginning at point A in FIGURE 14 and shorting tab 428. The tape runs for nine seconds until shorting tab 430 contacts shorting post 432. The shorting tab 428 and 430 and those to be described later on are pieces of conducting material such as aluminum foil, which extend across the width of the tape 412. When the shorting tabs pass across post 432, they short out the leads 434 and 436 connected thereto.

As indicated before, the tape recorder 410 runs for nine seconds until shorting tab 430 contacts shorting post 432. As indicated in FIGURE 13B, this connects relay momentarily to ground, thereby operating it to close switches 420*a* and 420*b*. Closing switch 420*a* latches relay through the first track 262, wiper 300, and track 264 to ground. Operation of switch 420*b* stops tape recorder motor 424 and starts dialer motor 234. The capacitor 438 serves to prevent arcing of the contacts. The arc-preventing capacitor 440 serves the same function for tape drive motor 424.

With the operation of switch 420*b* and the energization of dialer motor 234, clutch plate 126 begins to rotate. As clutch plate 126 rotates, it sweeps commutator contact 146 over contacts 188. It also sweeps common contact 148, and has in effect initiated movement of solenoid 150. This is schematically illustrated in FIGURE 13B.

Since the dialer motor is now rotating, the gear 210 will be ratcheted one tooth for each rotation of clutch plate 126 or ten angular degrees.

The ratcheting movement of gear 210 also rotates program wiper plate 228. After one rotation of clutch plate 126, the gear 210 is ratcheted ten angular degrees. The result is that in effect, the wiper blade 300, which also moves ten angular degrees is moved across notch 282 in track 262. This notch breaks the connection between track 262 to ground connected track 264 through wiper 300 and it unlatches relay 420, it being noted that shorting tab 430 would have moved past shorting post 432 due to the inertia of motor 424. Thus, the only connection between relay 420 and ground is through switch 420*a*, track 262, wiper blade 300 and track 264. This connection having been broken, the relay 420 is now unlatched.

Simultaneously with the ratcheting of gear 210, the telephone lifting mechanism 20 is actuated by energizing solenoid 64 from power supply 392 through line 394, switch 414*a*, conducting lead 442, switch 398, conducting lead 446, solenoid 64, fourth track 268, wiper blade 308 which now contacts track 268, and the second track 264, which is connected to ground. Capacitor 448 is an arc conducting capacitor for preventing arcing when wiper 308 leaves the end of track 268 and de-energizes solenoid 64.

It will be noted that the fourth track 268 extends to a position intermediate lines A and B. Thus, movement of gear 210 by one notch or 10 degrees, has caused wiper blade 308 to make contact with the fourth track 268. In position A, the wiper blade 308 had been in opening 294. Operation of the lifting mechanism through solenoid 64 also energizes conducting leads 450, and 452 to turn on the tape recorder amplifier. The amplifier has not been shown as it is conventional.

Also simultaneously with the movement of the gear 210 by 10 angular degrees, the wiper blade 310 is brought in contact with the fifth track 270. At position A, the blade 310 had been in opening 296. Movement of blade 310 into contact with track 270, connects it to ground. This effectively triple latches relay 414 to ground, relay 414 having been previously latched to ground through switch 414*b*, track 262A and wiper 298. Movement of wiper blade 300 ten angular degrees brings it out of contact with track 262 as it moves over notch 282. Thus, the latch circuit of relay 420 through the first track 262 is broken. Accordingly, switches 420*a* and 420*b* move to the position shown in FIGURE 13B, stopping dialer motor 234 and starting tape recorder motor 424.

The tape recorder motor 424 now runs for five seconds until shorting tab 456 contacts shorting post 432. The five seconds permits the telephone 16 to get a dial tone. The contacting of shorting post 432 by shorting tab 456 again operates relay 420, thereby stopping recorder motor 424 and starting dialer motor 234. Relay 420 is latched to the first track 262 through switch 420A.

With the initiation of the operation of dialer motor 234, clutch plate 126 begins to rotate, thereby operating the pawl mechanism and gear 210. The wiper blades and tracks are moved ten angular degrees bringing them to line C. In doing so, the following happen simultaneously:

Relay 420 is double latched to the ground through the third track 266 and wiper blade 306 as it moves from opening 290 into contact with said third track. The fourth track 268 continues to hold the telephone line open or "on." The connection through the fifth track 270 continues to maintain a double latch on relay 414. The gear 210 begins to ratchet through index marks as follows: C2–D–D2–E–E2–F–F2–G–G2–H–H2–J–J2–K–L and in doing so, it dials the police telephone number.

The police telephone number is dialed by movement of blade 214. Since the dialer motor is now rotating, the blade 214 will be ratcheted to connect contact 316 at index line C2 to the continuous contact 204, which is connected to ground through lead 458 and switch 390*d*. Thus, as commutator contact 146 touches contact 332 of group 188, a circuit is completed to solenoid 150 from power supply 392 through lead 446, switch 398, lead 442, switch 414*a*, and lead 394. The energization of solenoid 150 raises rocker arm 162 into a hole 144 for movement of free-floating clutch plate 130 and hence dialer 80. Finger 104 will rotate through nine-tenths of a revolution dialing the number 9 before rocker arm 162 is raised by the action of cam 184. On the next rotation of clutch plate 126, blade 214 rests between contacts 316 and 318 and solenoid 150 is not energized. Also arm 162 is reset. During the following rotation of clutch plate 126, the second contact 318 is connected to the continuous contact 204 and hence to contact 344 as wiper 146 sweeps by it. The rocker arm 162 is operated and the number "3" is dialed in the manner described above. This operation continues until blade 214 reaches the index position K, which is off the last contact 328 in contact group 194. When this occurs, the free-floating clutch plate 130 returns to its initial position in the manner heretofore described. The dialer motor continues to rotate, thereby ratcheting the gear 210, so that the wiper blade support and program wiper plate are at a position adjacent index line L.

At this position, the double latch on relay 420 is broken because wiper blade 306 is out of contact with the third track 266 in opening 292. However, the wiper blade 308 continues to hold the telephone line open on the fourth track 268, and the wiper blade 310 continues to maintain the double latch on relay 414 through the fifth track 270. At index position L, the wiper blade 300 will have moved over notch 288 thereby unlatching relay 420 by disconnecting it from ground. As a result of the unlatching of relay 420, the dialer motor 234 is stopped and the tape recorder motor 424 starts. The tape recorder broadcasts a message to the police department for sixty seconds until shorting tab 260 contacts shorting pole 432, thereby once again operating relay 420. Relay 420 again closes switch **420*b*, thereby stopping the tape recorder motor 424 and starting the dialer motor 234. The relay 420 is latched to ground through switch 420*a* and the first track 262**.

The gear 210 now moves the wiper blade support 206 and program wiper plate 228 ten angular degrees from index mark L to index mark M, and in doing so, it simultaneously unlatches relay 420 when wiper blade 300 passes over notch 286. This hangs up the telephone receiver by deactivating the solenoid 64 in telephone lifting mechanism 20 when wiper blade 308 moves into opening 296. The double latch on relay 414 is maintained in the fifth track 270. Operation of relay 420 stops the dialer motor 234 and starts the tape recorder motor 424. The tape recorder motor 424 runs for ten seconds, until shorting tab 462 contacts shorting pole 432 to operate relay 420. Relay 420 closes and latches through the first track 262, thereby stopping tape recorder motor 424 and starting dialer motor 234.

Operation of the dialer motor ratchets the gear 210 from index line M, to index line N, and in so going, it simultaneously unlatches relay 420 when wiper blade 300 passes over notch 284 in the first track 262. Wiper blade 308 again makes contact with the fourth track 268, thereby energizing solenoid 64 to operate lift mechanism 20 in the manner heretofore described, and the double latch on relay 414 is maintained through the fifth track 270. Since relay 420 is no longer connected through the first track 262, the dialer motor 234 stops and the recorder motor 424 starts. The tape recorder motor 424 runs for five seconds until shorting tab 464 on tape 412 contacts shorting pole 432 to operate relay 420. This permits the telephone 16 to get a dial tone. Relay 420 closes and latches through the first dialer track 262, thereby stopping tape recorder motor 424 and starting dialer motor 234.

The gear 210 is now ratcheted from index line N to index line O, and in so doing, brings wiper blade 306 back into contact with the third track 266 to maintain a double latch on relay 420. At index mark O, the telephone line is held open through wiper blade 308 and the fourth track 268, and a double latch on relay 414 is maintained through the fifth track 270. The gear 210 continues to ratchet through index lines as follows: O2–P–P2–Q–Q2–R–R2–S–S2–T–T2–U–U2–V–W. This last operation brings the wiper 214 into contact with contacts 256, thereby dialing the telephone number of the property owner. This dialing operation is the same as that described with respect to contacts 194 and therefore need not be repeated. Of course, the connections to contacts 188 will be sequentially arranged for the owner's number. It should also be noted that the contact groups 196 and 198 would have operated in the same manner had either the fire or some other alarm system been tripped to initiate them. Moreover, the wiper blades 216 and 218 would also have dialed the owner by making contact with contacts 256 subsequent to dialing either the fire department or the alternate alarm system number.

When the gear 210 reaches index line W, in addition to having dialed the telephone number of an owner, it will have removed the double latch on relay 420 through the third track 266. The telephone line continues to be held open through the fourth track 268, and relay 420 will have been unlatched due to the break or notch 278 in the first track 262.

With the unlatching of relay 420, the dialer motor 234 stops and the tape recorder motor 424 starts. The tape recorder now broadcasts a message to the owner for sixty seconds until shorting tab 428 contacts shorting pole 432 to operate relay 420. Operation of relay 420 latches it through the first dialer track 262 to ground. In accordance to principles previously discussed, the tape recorder motor 424 stops and the dialer motor 234 starts. Energization of the dialer motor 234 causes the gear 210 to be ratcheted from index line W to index line A. In so being ratcheted, it simultaneously unlatches relay 420 due to the break or notch 280 in the first track 262 and hangs up the telephone receiver 14 by deenergizing the solenoid 64 in lifting mechanism 20 by moving blade 308 into the opening 294 in track 268. The movement of gear 210 from index line W to index line A also removes the double latch from relay 414 due to the opening 296 in the fifth track 270.

Another function initiated by the gear 210 being ratcheted from index line W to index line A is to cause wiper blades 312 and 314 to sweep over sheet contact 260. This causes the shut-off relay 470 to close. Shut-off relay 470 is energized by current sent from power supply 392 through lead 394, lead 396, switch 398, lead 472, relay coil 470, lead 474, sheet contact 260, wiper blade 312 and 314, and lead 476 to ground. Energization of shut-off relay 470 moves relay switch **470*b* out of connection with the resistor 418 and thereby unlatches relay 414 if switch 398 has not previously been turned to the test or "off" position. If the main switch 398 has been turned to the "off" position, or to test, relay 414 will turn off all power completely without use of relay 470**.

While mention has been made of the specific relationship of the third track 266 to relay 420, it should also be pointed out that its incorporation in the apparatus has a specific function. The function for the third track 266 is that it provides a mechanism whereby the operation of the device cannot be gotten out of synchronization if power is shut off for any reason. Synchronization could be lost if the power is disrupted after an alarm is set off. Thus, should the power be cut while dialer motor 234 is running, then relay 420 will not be connected to ground through first track 262 due to the fact that switch **420*a* will remain open when power is restored. Accordingly, when the power is restored, the tape recorder motor will start to run completely throwing off the synchronization of the apparatus. This loss of synchronization is avoided by means of lead 478, which connects relay 420 to ground through the third track 266 and wiper 306, which is in contact with track 266 after index line C. Accordingly, when power is restored after a cut, the relay 420** will be necessarily connected to ground and synchronization will not be lost.

Throughout the description set forth above, it will be noted that from the time the relay 390 first operated due to an alarm being set off, relay 414 was double latched as follows: through conducting lead 422, switch **414*b*, conductor 424, track 262*a*, wiper 298, track 264** and round. After the first ten degree rotation of gear 210, elay 414 was then triple latched as follows: through onducting lead 422, track 270, wiper 310, track 264, and round. This feature prevents the operator from causing ny loss of synchronization through the manipulation of witch 398. He may by turning switch 398 to the test or off" position, after alarm has been set off, de-energize oth solenoid 150 and 64, thereby hanging up the telehone receiver and preventing the rocker arm 162 from ngaging free rotating clutch plate 130. This in turn will revent the rotation of dial 72 and 80 while the automatic elephone calling apparatus recycles itself to return to the tarting point at index line A.

The final function accomplished by ratcheting gear 10 from index line W to index line A is to completely nlatch relay 414. As indicated above, opening 296 in the fth track 270 breaks the double latch. Simultaneously, ne notch or opening 282 in track 262A breaks the conection to ground of relay 414 through switch 414*b*, track 62A (which is in reality track 262), wiper blade 298 nd track 264. It will be noted that wiper blade 298 is paced ten angular degrees ahead of wiper blade 300. ccordingly, when the apparatus has been shut off, with lade 300 positioned at point A, the blade 298 is at index ne B, thereby providing a ground for the next operation.

Movement of switch 398 to the test position will light amps 480, 482 and 484. This permits the user to deterine whether or not the various alarms circuits are in roper working order.

Movement of the switch 398 to the day position permits ne user to disconnect the burglar alarm from certain ooms, for example, while at the same time, maintaining with respect to other rooms for which twenty-four hour ecurity is desired. The connection for this type of operaon will be made to contacts 382, 384 and 386.

From the foregoing, it may be seen that the apparatus f the present invention has provided a means whereby eceipt of a police signal by contacts 378 and 380 initiated dialing operation. In other words, the device dialed the olice department, played back a recorded message to he police department, related to the alarm signal, turned ff the receiver 14, turned on the receiver, dialed the wner, office manager or the like, presented a recorded nessage to the owner, office manager or the like, related o the police message, and turned off the apparatus comletely. A different set of messages is on the second track f tape 412. The second set of messages could be for the re department.

Operation of the systems contacts 372, 374 would then perate the dialing mechanism in the same manner, howver, it would merely send a continuous telephone signal, uch as an 800 cycle tone, which the owner will immeliately recognize as indicating a malfunction at his place f business, such as a refrigeration breakdown, heating ailure, pressure system failure, etc.

The present invention may be embodied in other speific forms without departing from the spirit or essential ttributes thereof and, accordingly, reference should be nade to the appended claims, rather than to the foreoing specification as indicating the scope of the invention.

We claim:

1. Automatic telephone calling apparatus comprising a lialing head, connecting means for connecting said head vith a rotatable dial to rotate said dial, a free-floating lutch plate rotatably mounted for driving said connecting neans, a driven member fixedly secured to a shaft, said lriven member being spaced from said free-floating clutch plate, selectively operable clutch means for selectively ngaging said driven member with said free-floating clutch plate at variable relative angular positions of said driven nember and said clutch plate, a commutator switch roatively connected with said driven member for energizing aid selectively operable clutch means at a variable preletermined position during a cycle of rotation of said lriven member, limit means positioned to declutch said free-floating clutch plate from said driven member at the end of a cycle of rotation of said driven member, a commutator switch control head, said commutator switch control head having means thereon for determining the sequence of relative angular positions between said free-floating clutch plate and driven member at which said clutch means is energized by said commutator switch, said control head including indexing means for sequential index movement of said head, contact means providing sequential electrical connection between said control head and said commutator switch, a control system, said control system including means to start and stop rotation of said shaft, said control system including a program wiper plate sequentially movable with said indexing means, said program wiper plate providing pre-selected electrical connection between rotation means for said shaft and said means for starting and stopping said rotation means.

2. The automatic telephone calling apparatus of claim 1 with a wiper plate control switch means for selective energization of said rotation means and a tape recorder motor.

3. The telephone calling apparatus of claim 1 wherein said control system includes a tape player including a motor connected to drive a pre-recorded tape, first switch means connected to alternately connect said motor and said shaft rotation means to a source of driving energy, second switch means responsive to an alarm signal to connect said first switch means to a source of energy, said program plate comprising a plurality of conductive tracks, selected non-conductive portions in said tracks, said non-conductive portions being in position to break conductive contact between said tracks and wiper means associated therewith, third switch means responsive to the displacement of said tape, said third switch means being connected to said first switch means to cause switching of energy from said tape player motor to said rotation means, one of said conductive tracks being in the circuit of said rotation means, non-conductive portions in said one track at spaced positions for periodically disconnecting said first switch from said shaft rotation means.

4. The telephone calling apparatus of claim 3 wherein said program plate includes a second track, said second track including conductive portions positioned to cooperate with wiping means to maintain said first switch means in circuit connection with a source of energy when said third switch is opened and when the source of energy is temporarily interrupted, whereby synchonization of the apparatus is maintained.

5. The telephone calling apparatus of claim 3 wherein said apparatus includes an automatic system turn off switch, and said programming plate including a track for connecting said automatic system turn off switch to a source of energy at the end of the telephone dialing cycle.

6. The telephone calling apparatus of claim 3 wherein said program plate includes a track provided with at least one non-conductive portion, said track being connected to a telephone on-off means, said non-conductive portion being positioned in relation to the remaining conductive portion of said track so that said track is operative to connect and disconnect said telephone on-off means at predetermined intervals.

7. The telephone calling apparatus of claim 3 wherein said player motor drives said tape past a playback pickup head, said third switch means comprising shorting means mounted on said tape, said shorting means being driven over spaced shorting contacts to provide a conductive connection between said contacts, said conductive connection completing a circuit to energize said first switch means for stopping said motor and starting said shaft rotation means.

8. A telephone calling apparatus in accordance with claim 1 wherein said free-floating clutch plate is mounted co-axial of said driven member, a plurality of openings in said free-floating clutch plate, said openings being spaced about the axis of said plate in positions directly related to the holes in a telephone dial, said clutch means being mounted on said driven member, said clutch means comprising a rocker arm and a spring means for biasing said arm into a hole in said free-floating clutch plate, a solenoid normally retaining said rocker arm out of said free-floating clutch plate holes, said solenoid being connected to said commutator switch, whereby said commutator switch energizes said solenoid at predetermined points to release said rocker arm into said free-floating clutch plate holes.

9. Automatic telephone calling apparatus in accordance with claim 8 wherein said limit means comprises a cam mounted to bias said rocker arm out of said free-floating clutch plate holes, said cam being positioned to bias said rocker arm at the end of a complete rotation of said driven member.

10. Automatic telephone calling apparatus in accordance with claim 1 wherein said commutator switch comprises a plurality of electrical contacts spaced about an axis in positions directly related to the holes in a telephone dial, a common contact, and wiper means on said driven member for connecting said clutch means to said contacts.

11. Automatic telephone calling apparatus in accordance with claim 1 wherein said indexing means comprises an eccentric cam formed on said driven member, a cam follower, linkage means linking said cam follower to a pawl, a ratchet connected to said commutator switch control head in operative association with said pawl.

12. Automatic telephone calling apparatus in accordance with claim 1 wherein said commutator switch control head comprises a plurality of contacts corresponding to the digits in a telephone number to be dialed, and wiper means mounted on said control head for indexing movement therewith, means connecting individual ones of said control head contacts with individual ones of said commutator switch contacts.

13. Apparatus in accordance with claim 1 wherein said program plate comprises a plurality of conductive tracks, selected non-conductive portions in said tracks, said non-conductive portions being in position to break conductive contact between said tracks and wiper means associated therewith.

14. The telephone calling apparatus in claim 7 wherein said tape is provided with a plurality of shorting means at spaced apart intervals, said intervals being predetermined tape lengths to provide overall control for said apparatus.

References Cited

UNITED STATES PATENTS

| | | | |
|---|---|---|---|
| 2,813,931 | 11/1957 | De Forest | 179—90.1 |
| 2,830,119 | 4/1958 | Zimmerman | 179—90.1 |
| 2,952,740 | 9/1960 | Montrose | 179—90.1 X |
| 3,062,920 | 11/1962 | Sohacki | 179—90.1 |
| 3,078,349 | 2/1963 | Sasaki | 179—90.2 |

KATHLEEN H. CLAFFY, *Primary Examiner.*

J. W. JOHNSON, A. H. GESS, *Assistant Examiners.*